United States Patent

Megill

[11] Patent Number: 6,043,320
[45] Date of Patent: Mar. 28, 2000

[54] METHOD OF MAKING RUBBER

[76] Inventor: Robert W. Megill, Six Polaris Dr., Newark, Del. 19711

[21] Appl. No.: 09/148,621

[22] Filed: Sep. 4, 1998

Related U.S. Application Data

[63] Continuation of application No. 08/877,761, Jun. 17, 1997, Pat. No. 5,902,861.

[51] Int. Cl.⁷ .................................................. C08C 19/00
[52] U.S. Cl. ............................................. 525/332.6
[58] Field of Search ........................................... 525/332.6

[56] References Cited

U.S. PATENT DOCUMENTS

| | | |
|---|---|---|
| 226,057 | 3/1880 | Gerner . |
| 3,345,323 | 10/1967 | Endres et al. . |
| 3,422,052 | 1/1969 | Mather . |
| 3,951,722 | 4/1976 | Howson et al. . |
| 3,998,778 | 12/1976 | Berg et al. . |
| 4,098,989 | 7/1978 | Turner . |
| 4,342,647 | 8/1982 | McMillan et al. . |
| 4,788,231 | 11/1988 | Smigerski et al. . |
| 4,789,272 | 12/1988 | Matsubara et al. . |
| 4,917,834 | 4/1990 | Handermann et al. . |
| 5,195,695 | 3/1993 | Ondush et al. . |
| 5,902,861 | 5/1999 | Megill .................................. 525/332.6 |

FOREIGN PATENT DOCUMENTS

| | | |
|---|---|---|
| 945 337 | 4/1947 | France . |
| 2 087 551 | 5/1970 | France . |
| 20 50 175 | 10/1970 | Germany . |
| 2 019 749 | 12/1989 | Spain . |

*Primary Examiner*—Edward J. Cain
*Attorney, Agent, or Firm*—Connally Bove

[57] ABSTRACT

Rubber is made by mixing the rubber ingredients at elevated temperature in rubber mixing equipment to obtain a mixed rubber compound. The mixed rubber compound is cryogenically ground into a powder by the application of a cryogenic material into the grinder. A further ingredient is added to the mixed rubber compound powder in a mixer while the further ingredient and mixed rubber compound are in a dry condition to obtain a resulting mixture which is later vulcanized. In one embodiment the further ingredient is fragile ingredients.

15 Claims, No Drawings

METHOD OF MAKING RUBBER

CROSS-REFERENCE TO RELATED APPLICATION

This application is a continuation of Ser. No. 08/877,761, filed Jun. 17, 1997; now U.S. Pat. No. 5,902,861.

GOVERNMENT LICENSE RIGHTS

The U.S. Government has a paid-up license in this invention and the right in limited circumstances to require the patent owner to license others on reasonable terms as provided for by the terms of N.00178-95-D-1008 awarded by U.S. Navy, Dahlgren, Va.

BACKGROUND OF THE INVENTION

Various techniques have been attempted to improve and expand the properties of rubber. It would be desirable if techniques could be provided which would permit the incorporation of or increase in the amount of certain ingredients that can be added to the rubber formulations to achieve distinct properties. It would also be desirable if rubber making techniques could be used for producing an adhesive without the need for a solvent. It would further be desirable if rubber making techniques could be achieved which permits lower vulcanization temperatures to be used.

SUMMARY OF THE INVENTION

An object of this invention is to provide rubber making techniques which fulfills the above desires.

A further object of this invention is to provide such techniques which can utilize conventional rubber mixing and forming equipment to achieve such desires.

In accordance with this invention the basic rubber ingredients are mixed under conditions of heat in a conventional manner to obtain the desired mechanical strength. The mixed ingredients are ground in the presence of a cryogenic material to obtain a powdered mix. In one embodiment of the invention fragile ingredients are mixed with the powdered rubber and the mixture is then vulcanized. In another embodiment of the invention a resin reaction product is mixed with the rubber compound in the presence of a cryogenic to obtain the powder with the resultant rubber powder being components of a contact adhesive. The powder is applied to two substrates and then heated to activate the adhesives so that the substrates can be secured together when pressed into contact with each other.

DETAILED DESCRIPTION

The present invention relates to the improvement in rubber making techniques as described in application Ser. No. 533,342 filed Sep. 25, 1995, now abandoned, all of the details of which are incorporated herein by reference thereto. The invention is based upon the recognition that prior attempts at improving rubber making techniques have had shortcomings which the invention overcomes. In particular, the invention modifies the conventional rubber making techniques by allowing the rubber to be made in powder form which allows the incorporation of added ingredients such as fragile ingredients which would not survive conventional rubber mixing and forming equipment or the incorporation of resin reaction products which would adapt the rubber to be used as a solvent-free contact type adhesive.

Powdered rubber has been known since at least the early 1970's when its use was being promoted as an energy saving way to mix conventional rubber materials. The process never was widely used because the rubber parts produced using the powder mixing process did not have the mechanical strength which was obtained using the traditional mixing processes. Active development in producing homogeneous mixtures failed to provide materials of suitable physical strength. This was due to the failure to achieve the intimate association between the fillers and the rubber polymer. The reinforcement interaction of fillers with rubber is particularly evident with carbon black but is also evident to a smaller degree with non-black (mineral fillers). This reinforcement reaction appears to require heat and often shear to be accomplished. Heat is certainly not available during cryogenic mixing and the type of shear produced in conventional rubber mixing is not present in the cryogenic processes.

The present invention utilizes conventional rubber making equipment wherein the basic ingredients are mixed under conditions of heat in suitable known mixers so as to obtain the desired mechanical strength. The mixed ingredients are then ground in the presence of a cryogenic material to form a powder. The advantage of utilizing a cryogenic material is that it makes the rubber ingredients brittle thereby readily permitting the rubber compound to be made into powder. Thus, the invention has as an advantage that the rubber compound is mixed in conventional rubber equipment under conditions of heat prior to being cryogenically ground and can then be made into a rubber material with mechanical properties typical of those obtained with conventional manufacturing procedures that do not use powdered rubber. One significant advantage of the new process is that after the rubber compound is powdered, fragile ingredients can be added which would not survive the conventional mixing processes. The addition of these ingredients provides rubber materials with physical properties previously unattainable from rubber. These properties include:

- unique electrical properties useful for producing materials for electronic shielding and microwave absorption (carbon fibers);
- very high extensive modulus produced from large amounts of chopped textile fibers (e.g. KELVAR®). These fibers can be added in quantities which would cause too high a viscosity build up in conventional mixers;
- light weight materials by the addition of glass or plastic miscrospheres;
- very durable materials by the addition of strengthening agents which are too abrasive to be mixed in conventional equipment.

With the present invention it is possible to make sponge rubber containing fibers for added strength or improved electrical properties. When sponge is produced in conventional processes, the addition of fibers causes a concentration of the gas and blisters rather than a homogeneous cell structure. In accordance with the technology of this invention unexpanded plastic balloons are added to the powder and allowed to expand during the vulcanization process.

With the invention it is also possible to make adhesives which do not require the use of solvents, especially neoprene contact adhesives. Adhesives based on neoprene have been used for over sixty years for providing fast strong adhesive bonds between many different substrates. The key to the rapid formation of these bonds is the interaction between neoprene and the product which results from the reaction of magnesium oxide and tertiary butyl phenolic resin. When two films of neoprene contact adhesive are placed together a high strength bond is formed almost instantaneously because the two films act as one without having to be melted together. Just the surfaces of the films need to touch for the strong bond to be formed. In almost all prior applications, the adhesive film has been deposited from a solvent because the adhesive is usually manufactured in a solvent and the solution of the adhesive is easy to apply by brush, spray or other liquid handling techniques. Activating the films using solvent or heat has been used since the early days of this technology. With the invention the unique response of these materials to heat activation has been utilized but employing it to produce a solvent-free adhesive has not been thought of before.

For about thirty years researchers have been trying to develop a neoprene contact adhesive which does not require the use of solvents. The increasing awareness of toxicity problems and the fire hazards make solvent based adhesives very difficult to use today. A solvent-free contact adhesive product is achieved with the invention by using the powder process wherein the two basic components produced in a conventional way, then powdering the two components and mixing them as powders. However, the mixing operation can be carried out during grinding.

In the various practices of this invention, the first step would be to mix the basic rubber ingredients using traditional mixing processes which involve heat in order to obtain the desired mechanical strength. The ingredients are then formed into a powder in the presence of a cold hardening agent.

The cold hardening agent could be any suitable cryogenic such as dry ice or liquid nitrogen, with liquid nitrogen being the preferred cryogenic material. In accordance with this invention the grinding of the rubber takes place in the cold atmosphere to make the rubber brittle and to avoid the rubber massing back together.

In one practice of the invention liquid nitrogen is sprayed into the grinder. It is preferable to pre-chill the rubber in liquid nitrogen just prior to being placed in the grinder. The amount of liquid nitrogen would depend on the type of grinder and the particle size that is desired which would be, for example, from 0.10 to greater than 100% by weight of $N_2$ which can be used. Usually, the amount of $N_2$ needed is from 1 to 3 times the weight of the rubber.

Any suitable grinding equipment can be used. Preferably the grinder has a port or ports where the liquid nitrogen is introduced. The invention has been successfully practiced using an attrition mill. Other types of grinding equipment that could be used include hammer mills, pin mills and Fitz mills.

Using powdered rubber allows the incorporation of, or the increase in the amount of certain desirable ingredients that can be added to rubber formulations to achieve unique properties.

After the rubber is ground, the selected ingredient(s) is mixed into the powder and then vulcanized. In most cases, the rubber compound is mixed in conventional rubber processing equipment prior to grinding.

The use of powder mixing allows the incorporation of fragile ingredients (e.g. micro-balloons) which would not survive conventional rubber mixing and forming equipment.

Using the powder process also allows the incorporation of large amounts of certain materials (e.g. chopped fibers) whose concentration would be limited by viscosity buildup in conventional techniques.

The orientation, or grain, imparted to rubber during conventional rubber processing can be eliminated or greatly reduced using powder mixing. Achieving random orientation of fragile materials (e.g. carbon fibers) in a vulcanized rubber part is also possible using powder.

Examples of such desirable materials include polyaramid fibers (e.g. KEVLAR® fibers), carbon fibers, metal coated carbon or textile fibers, ceramic fibers, large amounts of nylon, cotton, polyester, etc. up to 200% more of the additives than the rubber, with 0.1–100% by weight being preferred. In addition, glass or plastic beads, and many other products that can not survive standard rubber manufacturing techniques can also be added.

The use of such additional ingredients provides many desirable properties including high impact strength, abrasion resistance, controlled conductivity, controlled density, ability to float, weight reduction, enhancement of acoustical performance, enhancement of microwave absorption and increased flex resistance. Where, for example, KEVLAR® fibers are used, 5–200% by weight of the fibers compared to the rubber is added from an equal size to a much bigger size than the rubber with the size being up to 2 inches in length. The invention has been practiced grinding to 30 mesh but can be either larger or smaller.

A significant advantage of the present invention is in a reduction of the temperature needed for vulcanization. In the normal rubber vulcanization process the vulcanization of the rubber has been from 8 to 10 minutes at 350° F. The present invention permits the vulcanization temperature to be lowered to about 190° F. which is significantly below the traditional minimum of about 275° F. This is possible because vulcanization materials can be added to the powder that are too active to be added during the normal rubber processing. This allows low melting products such as plastic beads to be vulcanized into a rubber part. The rubber can be vulcanized in accordance with the invention, in practical times at these low temperatures in a range of, for example, 190° F.–250° F. The vulcanizing time could be in the range of 10 minutes to 2 hours. The thickness of the rubber part would determine the time and temperature requirements for such vulcanization.

Where the invention is used to permit the incorporation of fragile ingredients the following steps summarize the practice of the invention:

1. Mix all but fragile ingredients in standard rubber mixing equipment (high shear). This allows the normal reinforcement from carbon black and other fillers, as well as providing a homogeneous mixture. Any suitable known mixing equipment can be used.
2. Cryogenically grind the mixed rubber compound into powder in the presence of partioning agent (i.e. talc).
3. Mix the powdered rubber with the fragile ingredients in a low shear mixer while the fragile ingredient and rubber compound powder are in a dry condition. (A "V" blender can be used.)
4. Vulcanize the resulting mixture in a standard rubber mold. The mold should be filled with the mixed powder in such a way as to minimize air entrapment and orientation of fibrous materials. A Teflon coated mold is preferred to using a metal surface mold which requires mold release. It is important to avoid high shear rubber processes after the fragile ingredients are added to prevent breakage.
5. Other materials can be added in the powder mixing stage, such as:
   (a) highly reactive vulcanizing agents;
   (b) selected plasticizers to provide softer materials than can be processed on standard rubber equipment;

(c) high concentrations of fibers and other materials which would cause too much viscosity increase to be processed in standard rubber equipment; and (d) abrasive materials which would damage standard rubber equipment.

The use of powdered rubber also permits production of an adhesive without the need for a solvent. In this practice of the invention the adhesive ingredients are mixed as powders and then heated to form a film. This practice appears most useful (but is not limited to) a neoprene contact-bond adhesive. In this type of product, both substrates are coated and then bonded after heat activation. A flame sprayer can be used to apply the adhesive and to heat activate the bond when the substrates are combined outside of controlled factory conditions.

When producing a neoprene contact-bond adhesive, as described above, the metal oxide reaction product of the p-tertiary butyl phenolic resin is made available in a dry (non-solvent) form. This can be achieved by obtaining reacted resin from the resin manufacturer, or by reacting the base resin and isolating the dry product.

In the making of such an adhesive the powdered rubber ingredients would also be produced by grinding the rubber ingredients in the presence of a cryogenic.

The following is an example of the composition of such an adhesive.

|  | PREFERRED | RANGE |
| --- | --- | --- |
| Neoprene | 100 | 100 |
| antioxidant | 2 | 0–8 |
| magnesium oxide | 8 | 2–16 |
| tertiary butyl phenolic resin | 45 | 10–200 |
| zinc oxide | 5 | 0–20 |
| water | 0.5 | .1–5 |

The above components would be prepared by (a) mixing with normal rubber equipment
  neoprene
  antioxidant
  zinc oxide
  sometimes ½ of the MgO (b) mixing in toluene (or other suitable solvent(s))
  tertiary butyl phenolic resin
  magnesium oxide (sometimes ½)
  water Part (b) is dried (i.e. solvent evaporated) and added to part (a) during grinding or blended in after grinding.

For large scale production part (b) could be obtained from a resin supplier, thus avoiding the need for a solvent.

The advantage of this process is that the flammable, toxic, and expensive solvents are eliminated.

Part (a) is mixed on a 2 roll mill or in an internal mixer. Part (b) is usually mixed overnight in a churn for production.

In the laboratory, part (b) is mixed in a can on rolls overnight. This process can usually be carried out at ambient temperature.

If the neoprene "contact bond" adhesive is made using standard techniques, part (a) and part (b) are mixed in a solvent after part (a) has been dry mixed. The adhesive film is then applied by brushing, spraying, roller coating, etc. the adhesive is applied to both substrates to be bonded. The adhesive films on the substrates can be brought together just before the films are completely free of solvent thus forming a "Bond upon Contact" or "Contact Bond". If the films dry completely they will not bond when contacted. To reactivate the bond the two films can be coated with a thin layer of solvent (solvent reactivation) or one or both films can be heated above 160° F. (above 200° F. is preferred) and the films will then bond when brought together. This procedure is called heat activation or heat reactivation.

In using the powder process of this invention, the powdered adhesive is usually applied to both substrates. The adhesive can be applied and then heated to form a film. Infrared heaters are preferable but microwave heating could also be used. Microwave heating can be enhanced by adding microwave active materials to the adhesive, the simplest additive being carbon black.

The adhesive film can also be applied and formed into a film simultaneously, using a powder flame spray technique. This technique is now used to apply thermoplastic coatings on metal. The powder is blown through a flame which melts the powder so that it forms a film when it hits the substrate. The substrates can be bonded before the adhesive film cools off (<160° F.). Alternatively, the films on both substrates can be allowed to cool. Then one or both films on the two substrates can be heat reactivated or heat activated using the flame from a flame sprayer or any other means to raise the temperature above 160° F.

In practice, the films are usually heated above 200° F. so they can be brought together before they cool below 160° F. The two films could also be "solvent activated" although it is preferred to avoid all solvents if possible.

The following summarizes the steps in the making of a non-solvent adhesive:

1. Mix all the adhesive ingredients except the resin in conventional rubber mixing equipment (Banbury, mill, etc.)

2. Prepare the magnesium oxide reaction product of the tertiary butyl phenolic resin (for neoprene contact bond adhesives only). This process can be carried out in bulk by the resin manufacturer. Alternatively, the process can be carried out in a small amount of solvent which can be recovered when the reaction product is isolated and dried.

3. Cryogenically grind the adhesive compound to a fine powder-either alone or in the presence of the resin reaction product or another type of resin.

4. Mix the ingredients as dry powders. This step may not be necessary if all the ingredients have been ground together.

5. Apply the powder to the two substrates to be bonded.

6. Heat the powder on the substrates to form an adhesive film on each substrate.

7. Bring the two films together to form the adhesive bond.

In conventional techniques, the adhesive compound and resin are mixed in solvent and applied to the two substrates in the solvent and allowed to dry before bonding. This conventional technique allows flammable, toxic and costly solvents to escape into the atmosphere. The use of flame spraying to apply the adhesive powder and form a film at the same time with the invention offers a practical method of combining materials on a large scale.

Many other methods for applying the adhesive powder to the substrates and heating it to form a film can be used. The preferred method for any specific application will depend on the type, size and, shape of the substrates to be adhered.

A neoprene contact bond adhesive is most likely the major use of this invention, but it can be used for many other types of adhesives.

As can be appreciated the present invention thus has wide application in expanding the properties of rubber products.

What is claimed is:

1. A method of making rubber comprising mixing the rubber ingredients including rubber polymer and filler at high shear and at elevated temperature in rubber mixing equipment to obtain a mixed rubber compound, cryogenically grinding the mixed rubber compound into powder by the application of a cryogenic material into the grinder, providing a further ingredient selected from the group consisting of fragile ingredients and highly reactive vulcanizing agents and platicizers and abrasive materials and a high concentration of chopped fibers, adding the further ingredient to the mixed rubber compound powder after the mixed rubber compound has been ground into a powder, mixing the further ingredient and mixed rubber compound powder in a mixer while the further ingredient and the mixed rubber compound powder are in a dry condition to obtain a resulting mixture, and vulcanizing the resulting mixture to obtain a rubber product.

2. The method of claim 1 including spraying liquid nitrogen as the cryogenic material during the grinding step.

3. The method of claim 2 including pre-chilling the rubber ingredients in liquid nitrogen prior to the grinding step.

4. The method of claim 2 wherein 1 to 3 times liquid nitrogen is used as compared to the weight of the rubber ingredients.

5. The method of claim 2 wherein the vulcanization step takes place at about 190° F. to 250° F.

6. The method of claim 1 wherein the further ingredient is in the form of fragile ingredients.

7. The method of claim 6 wherein the fragile ingredients include micro-balloons.

8. The method of claim 6 wherein there is a random orientation of the fragile ingredients after vulcanization.

9. The method of claim 6 wherein the fragile ingredients are thin carbon fibers.

10. The method of claim 6 wherein the fragile ingredients are chopped textile fibers.

11. The method of claim 6 wherein the fragile ingredients are strengthening agents.

12. The method of claim 1 wherein the rubber product is sponge rubber and the further ingredient is fibers.

13. The method of claim 1 wherein the further ingredient is highly reactive vulcanizing agents.

14. The method of claim 1 wherein the further ingredient is plasticizers.

15. The method of claim 1 wherein the further ingredient is abrasive materials.

* * * * *